United States Patent Office 3,352,809
Patented Nov. 14, 1967

3,352,809
POLYGLYCIDYL ETHER OF A POLYHYDRIC COMPOUND WITH A MINOR AMOUNT OF A POLYEPOXIDE FORMED BY THE REACTION OF DIGLYCIDYL ETHER WITH A POLYHYDRIC PHENOL
Robert L. Carlyle and Glenn E. Gaumer, Lake Jackson, Tex., assignors to The Dow Chemical Company, Midland, Mich., a corporation of Delaware
No Drawing. Filed Nov. 5, 1963, Ser. No. 321,433
5 Claims. (Cl. 260—30.4)

This invention relates to an epoxy resin having a high gel strength. More particularly, it concerns a resin having an improved ability to retain finely divided solids in suspension and to promote the resuspension of settled solids.

Some applications for epoxy resins require the incorporation of a finely divided solid to impart a desired color or light opacity or simply as a filler for the resin. Considerable difficulty has been experienced in keeping these solids dispersed uniformly in the resin. In some instances, the solids settle out during storage of the resin prior to use and are extremely difficult to redisperse. Another problem is that sedimentation occurs during the time the resin is curing. This is a particularly serious problem in that the cured resin is not homogeneous. In the case of resins containing multiple component coloring pigments, the settling rates of the various colored pigments may be different, resulting in a color spectrum in the cured resin.

It is therefore an object of our invention to produce an epoxy resin having a higher gel strength with an accelerated gellation whereby the sedimentation rate of finely divided solid particles is greatly reduced. Additionally, solids which have settled during extended periods of storage are easily re-dispersed.

According to this invention, the gel strength of the epoxy resin, i.e., the ability of the fluid resin to maintain solids in suspension, is enhanced by admixing therewith from 0.5 to about 30 weight percent of a polyepoxy polyhydric ether of diglycidyl ether and a polyhydric phenol. These polyepoxy polyhydric ethers may be obtained by the reaction of diglycidyl ether with a polyhydric phenol whereby the epoxy group at one end of the diglycidyl ether molecule opens and adds to one of the phenolic hydroxyl groups, producing an ether linkage and forming an aliphatic hydroxyl group on the diglycidyl ether moiety. The epoxy group at the other end of the diglycidyl ether molecule is preserved and remains as a potentially reactive group. In this manner each of the phenolic hydroxyl groups is etherified with diglycidyl ether, resulting in the polyhydric ether. The product may be represented by the following formula:

wherein R is a polyhydric phenol moiety and $n$ is an integer such that the molecular weight of the ether is from about 370 to about 4000. Polyhydric phenols which may be etherified with diglycidyl ether to produce these suspending agents include hydroquinone, resorcinol, 4,4-dihydroxydiphenyl, bis(4-hydroxyphenyl)methane, 2,2-bis-(4 - hydroxyphenyl)propane, dihydroxydiphenylsulfone, dithiodihydroxydiphenyl and the novolacs produced by the condensation of phenol and formaldehyde, producing a compound having from 2 to about 4 phenol groups connected by methylene groups. Novolacs having more than 2 hydroxyl groups may add diglycidyl ether at each hydroxyl, producing an ether linkage and an aliphatic hydroxyl group. The reaction product of hydroquinone and diglycidyl ether where $n$ is zero has a molecular weight of only 370 whereas the product of bisphenol A rather than hydroquinone and having a value of $n$ of about 10 has a molecular weight of about 4000.

Epoxy resins which may be used in accordance with this invention may be described generally as the polyepoxides of polyhydric compounds produced by the reaction of an epihalohydrin such as epichlorohydrin with a polyhydric compound such as a novolac or phenol-formaldehyde condensate, 4,4-dihydroxydiphenyl, bis(4-hydroxyphenyl)methane, 2,2 - bis(4-hydroxyphenyl)propane, thio bis(4-hydroxyphenyl), and 4,4-dihydroxydiphenyl sulfone, as well as their nuclear halogenated derivatives. Another class of polyhydric compounds which may be used in producing the epoxy resins are the aliphatic compounds such as ethylene glycol, propylene glycol, diethylene glycol, etc. Additionally, mixtures of these resins may be used.

A diglycidyl ether derivative of the type represented by Formula I where $n$ is equal to one has four aliphatic hydroxyl groups and two epoxy groups. The hydroxyl groups function as accelerators in curing epoxy resins containing this derivative while the terminal epoxy groups provide reactive groups for the thermosetting reaction.

A diglycidyl ether derivative suitable for use according to this invention was prepared by reacting diglycidyl ether, i.e., di-2,3-epoxypropyl ether, in a 10 to 1 mole ratio with bisphenol A at 125° C. for 5½ hours in the presence of a basic catalyst. At the end of that time unreacted diglycidyl ether was removed by high vacuum distillation yielding a light yellow viscous resin having an epoxide equivalent weight of about 250. The product may be represented by Formula I where R is the bisphenol A moiety and $n$ is approximately zero. Thus the ether molecule contains 1 bisphenol A moiety and 2 of diglycidyl ether.

A series of tests were made with an epoxy resin containing different percentages of this derivative of diglycidyl ether. The reactivity and properties of these mix-

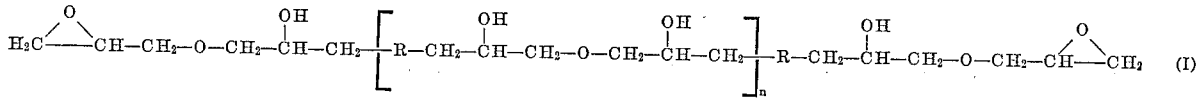

tures were determined with various curing agents. The resin used in these mixtures was the diglycidyl ether of bisphenol A having an epoxide equivalent weight of 186–192. The properties of these resins are listed in Table I.

TABLE I

| Percent of Derivative in Epoxy Resin | Curing Agent | Gel Time (Burrell Gelometer), Minutes | Percent Elong. | Flexural Strength, p.s.i. | Tensile Strength, p.s.i. |
| --- | --- | --- | --- | --- | --- |
| 0 | DETA [1] | 36 at 25° C | 8 | 14,500 | 12,000 |
| 10 | DETA | 26 at 25° C | 8 | 17,000 | 12,000 |
| 20 | DETA | 16 at 25° C | 10 | 16,000 | 11,400 |
| 30 | DETA | 11 at 25° C | 11 | 17,800 | 11,200 |
| 0 | MDA [2] | 168 at 60° C | 5 | 14,700 | 9,000 |
| 10 | MDA | 107 at 60° C | 7 | 17,000 | 10,000 |
| 20 | MDA | 63 at 60° C | 8 | 17,500 | 11,300 |
| 30 | MDA | 53 at 60° C | 8 | 18,600 | 11,900 |
| 0 | Polyamide [3] | 29 at 60° C | 10 | 11,000 | 9,600 |
| 10 | do | 23 at 60° C | 10 | 10,300 | 8,400 |
| 20 | do | 19 at 60° C | 8 | 9,800 | 8,700 |
| 30 | do | 13 at 60° C | 10 | 10,300 | 8,300 |

[1] Diethylenetriamine.
[2] Methylene dianiline.
[3] Reaction product of dimerized linoleic acid and ethylene diamine having an amine value of 350–400.

The samples cured with diethylenetriamine and the polyamide were cured 16 hours at 80° C. The samples cured with methylene dianiline were prepared by first heating the resin to 65–70° C. The methylene dianiline was heated to 100° C. then mixed with the heated resin and poured into molds. After curing at room temperature for 16 hours the resin was post-cured at 165° C. for four hours.

The flexural tests were made with samples ½ inch square on an Instron tensile machine at a crosshead speed of 0.05 in./min. Tensile samples ¼ in. x ⅛ in. were pulled at 10 in./min. crosshead speed.

The data in Table I illustrate the increased rate of gellation, i.e., shorter gell time, which is obtained as the percentage concentration of diglycidyl ether derivative increases with no significant changes resulting in the properties of the cured resin.

Another series of tests were made to demonstrate the ability of resin solutions containing varying amounts of this diglycidyl ether derivative to retard the sedimentation of coloring pigments. The resin solutions containing the additive were prepared by dissolving 45 grams of resin with the additive in 53 ml. of a solvent comprising a mixture of equal volumes of toluene, methyl isobutyl ketone, and diacetone alcohol. The epoxy resin used in these tests was the diglycidyl ether of bisphenol A having an epoxide equivalent weight of 475–575. The diglycidyl ether derivative used to increase gel strength and decrease the rate of pigment sedimentation was one according to formula I wherein R is the bisphenol A moiety and $n$ is approximately one. After the resin and diglycidyl ether derivative were dissolved in the solution, 50 grams of titanium dioxide white pigment and 4 grams of iron oxide black pigment were uniformly mixed into the solution, producing a gray resin solution. The black oxide settles relatively fast in solutions having a low gel strength leaving a white solution. The relative rates of sedimentation of the various solutions are reported in Table II.

TABLE II

Percent Additive Based on
Total Weight of Additive        Time to Appearance fo
+ Resin:                        Whiteness, days
0 ------------------------------------- 1
1 ------------------------------------- 7
2 ------------------------------------- 30
4.5 ----------------------------------- >30
10 ------------------------------------ >30

Another important characteristic of resins containing solids in suspension is the ease with which the solids can be re-suspended when they have settled during storage. The results of tests designed to evaluate this characteristic are reported in Table III. In these tests resin solutions were prepared by uniformly mixing 64.5 parts by weight of an epoxy resin containing the indicated weight percent of the diglycidyl ether derivative with 10.5 parts by weight of butylglycidyl ether and 75 parts of a powdered aluminum paint pigment. The epoxy resin was a diglycidyl ether of bisphenol A having an epoxide equivalent weight of 186–192. The diglycidyl ether derivative was one according to Formula I wherein R is the bisphenol A moiety and $n$ is approximately zero except in the case of sample No. 6 which contained a higher molecular weight derivative where $n$ is approximately one.

TABLE III

| Sample No. | Percent Additive by Wt. of Total Resin + Additive | Remarks |
| --- | --- | --- |
| 1 | 0 | Could be very easily redispersed up to 3 days. [1] |
| 2 | ½ | Could be very easily redispersed up to 5 days. [2] |
| 3 | 1 | Could be very easily redispersed up to 7 days. [2] |
| 4 | 5 | Could be very easily redispersed up to 10 days. [3] |
| 5 | 10 | Could be very easily redispersed up to 15 days. [3] |
| 6 | 1 | Could be very easily redispersed up to 10 days. [3] |

[1] Could be redispersed by hand after 30 days only with great difficulty.
[2] Could be redispersed by hand after 30 days with moderate difficulty.
[3] Could be redispersed by hand after 30 days with ease.

From the above it can be seen that the relative ease with which the aluminum pigment can be re-dispersed varies with the concentration of the diglycidyl ether derivative, with the resin containing none of this additive being re-dispersible up to three days whereas that containing 10 percent of the additive was re-dispersible up to 15 days. Also the higher molecular weight additive in sample No. 6 was more effective than the equivalent concentration of the lower molecular weight additive in sample No. 3.

Calcium carbonate, a filler sometimes added to epoxy resins, was added to an undiluted epoxy resin comprising the diglycidyl ether of bisphenol A having an epoxide equivalent weight of 182–189 and viscosity of 7,000–10,000 cps. at 25° C. Equal parts by weight of the filler and resin were mixed then placed in a constant temperature oven at 115° F. Packing of the calcium carbonate which settled to the bottom of the container was checked periodically by inserting a thin spatula to the bottom of the container and moving it back and forth. The filler was found packed very tightly in the bottom of the container. When the resin contained as little as 2 percent by weight of the diglycidyl ether derivative the filler did not pack tightly but produced a mushy sediment which was easily re-dispersed.

The diglycidyl ether derivatives which we have found to improve the properties of epoxy resins containing dispersed solids may be used to advantage in concentrations as low as 0.5 weight percent and as high as 30 percent. The particular concentration used may be selected on the basis of permissible sedimentation rates. Solvents and reactive diluents generally are used with highly viscous and normally solid resins but only an amount which is sufficient to fluidize the resin so that it can be spread easily. Resins containing excessive solvent or diluents have high sedimentation rates, even in the presence of our unique suspending agents.

We claim:

1. An epoxy resin composition characterized by an

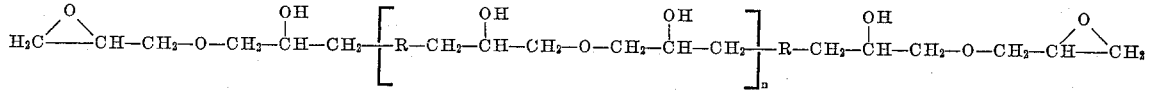

improved ability to suspend finely divided solids comprising a polyglycidyl ether of a polyhydric phenol or a polyhydric alcohol having intimately mixed therewith from 0.5 to about 30 weight percent of a different polyepoxy polyhydric ether having the general formula

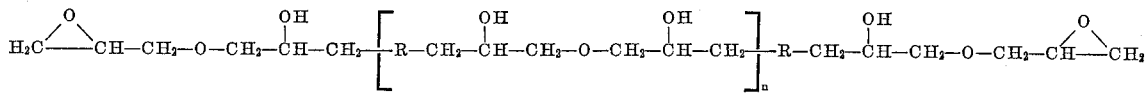

wherein R is a polyhydric phenol moiety and $n$ is an integer such that the molecular weight of said polyepoxy polyhydric ether is from about 370 to about 4000.

2. A composition according to claim 1 wherein said polyglycidyl ether of a polyhydric phenol or a polyhydric alcohol is the diglycidyl ether of 2,2-bis(4-hydroxyphenyl)propane and said polyepoxy polyhydric ether is a compound wherein R is a 2,2-bis(4-hydroxyphenyl)propane moiety and $n$ is about 1.

3. A resin according to claim 1 wherein R is the 2,2-bis(4-hydroxyphenyl)propane moiety.

4. A fluidized epoxy resin composition having improved solids suspension properties comprising an epoxy resin consisting of the diglycidyl ether of 2,2-bis(4-hydroxyphenyl)propane having an epoxide equivalent weight of 186–192 and from 0.5 to about 30 weight percent of a different diepoxy dihydric ether of diglycidyl ether and a dihydric phenol having the general formula

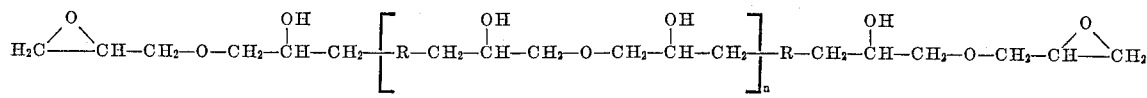

wherein R is a polyhydric phenol moiety and $n$ is an integer such that the molecular weight of said polyepoxy polyhydric ether is from about 370 to about 4000, together with sufficient butyl glycidyl ether to fluidize said resin in the presence of finely divided solids.

5. A method of retarding the sedimentation of finely divided solids in a fluidized epoxy resin composition comprising: uniformly mixing with a polyglycidyl ether of a polyhydric phenol or a polyhydric alcohol and solids a different polyepoxide polyhydric ether of diglycidyl ether and a polyhydric phenol having the general formula wherein R is a polyhydric phenol moiety and $n$ is an integer such that the molecular weight of said polyepoxy polyhydric ether is from about 370 to about 4000, the quantity of said polyepoxide polyhydric ether being from 0.5 to about 30 percent of the weight of said resin mixture, exclusive of said dispersed solids.

References Cited

UNITED STATES PATENTS

| | | | |
|---|---|---|---|
| 2,512,996 | 6/1950 | Bixler | 260—830 |
| 2,592,560 | 4/1952 | Greenlee | 260—47 |
| 3,100,756 | 9/1963 | Fry | 260—830 |

OTHER REFERENCES

May, "Industrial & Engineering Chemistry," vol. 53, No. 4, April 1961, pp. 303–4.

SAMUEL H. BLECH, *Primary Examiner.*

MURRAY TILLMAN, *Examiner.*

P. LIEBERMAN, *Assistant Examiner.*